Sept. 27, 1960

C. E. SMITH 2,954,112

POULTRY FEEDER

Filed Aug. 3, 1953

INVENTOR
CLAYTON E. SMITH
BY *Sellers & Latta*
ATTORNEY

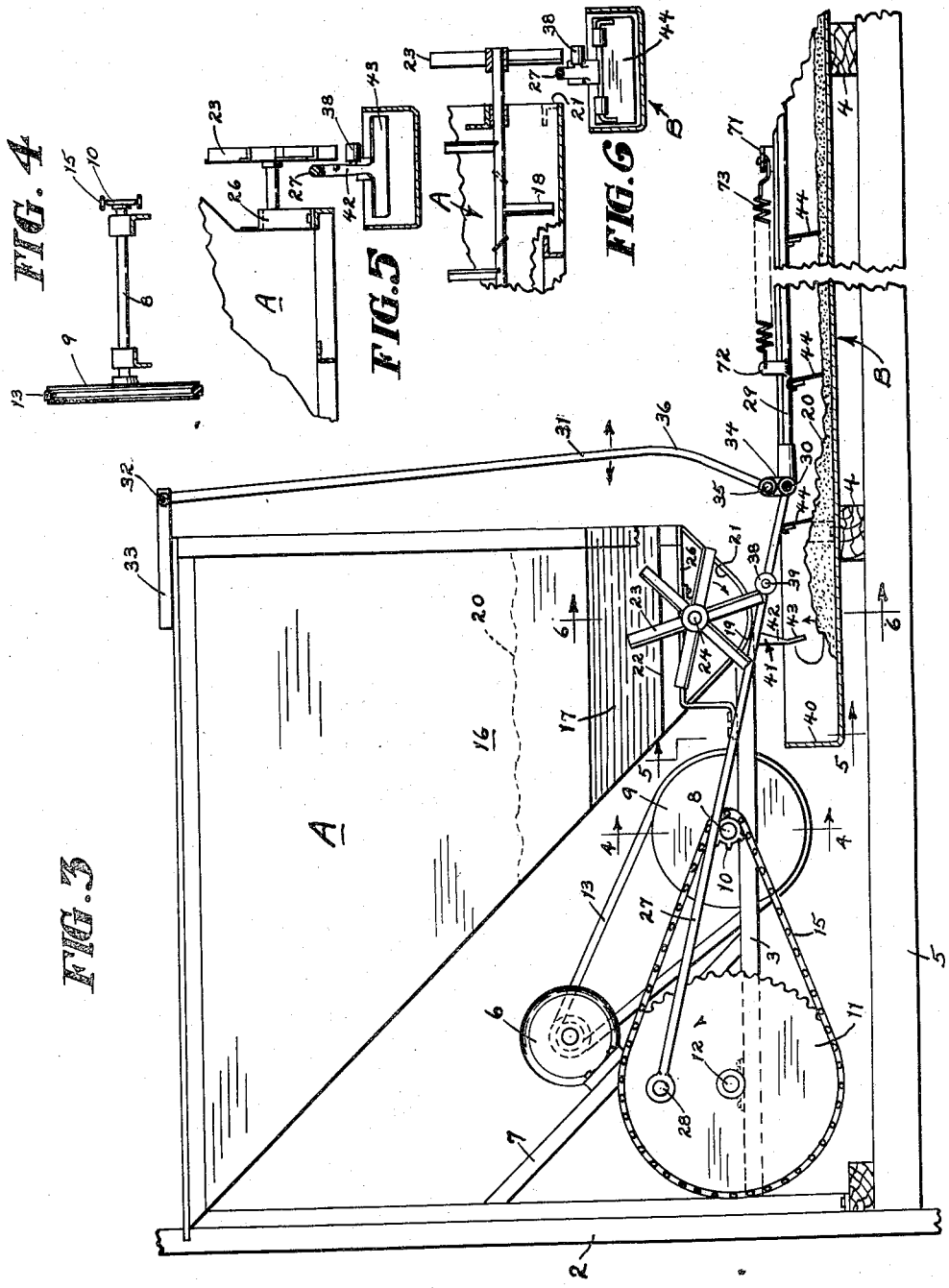

Sept. 27, 1960     C. E. SMITH     2,954,112
POULTRY FEEDER
Filed Aug. 3, 1953     3 Sheets-Sheet 3
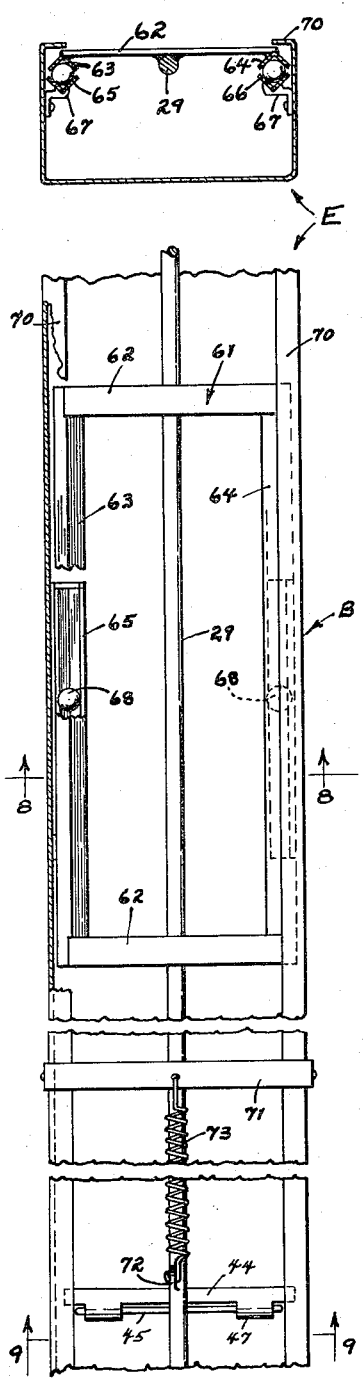
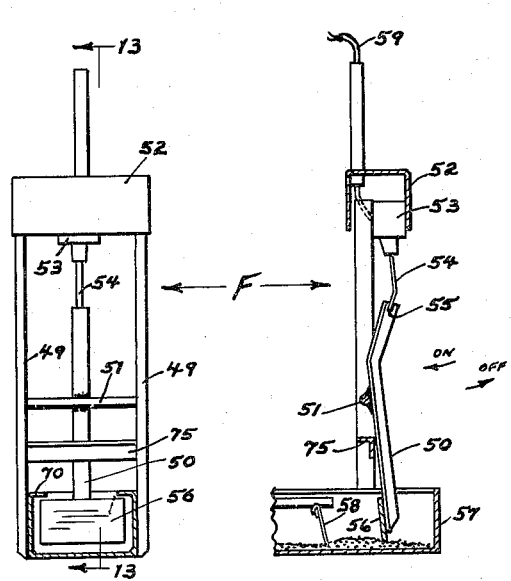
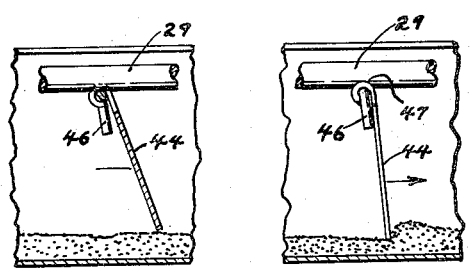
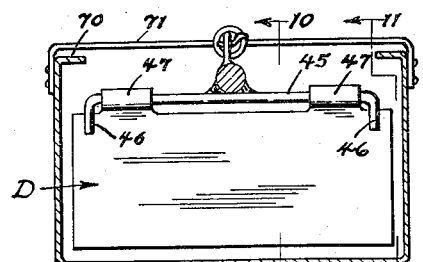
INVENTOR
CLAYTON E. SMITH
BY Sellers and Latta
ATTORNEY _United States Patent Office_ 2,954,112
Patented Sept. 27, 1960

2,954,112
POULTRY FEEDER

Clayton E. Smith, Palmdale, Calif., assignor to Harold O. Moist, Palmdale, Calif.

Filed Aug. 3, 1953, Ser. No. 372,044

8 Claims. (Cl. 198—54)

This invention relates to an automatic power operated feed moving or distributing device particularly useful for distributing a granulated type of feed which is initially stored in a hopper, the feed being spilled from the discharge mouth of the hopper into a trough which may be of considerable length, said trough being closed off at its terminal end.

An important object of the invention is to provide a feed distributing device employing a reciprocating type of carrier disposed above the trough which receives the feed, said carrier having feed pushing paddles connected thereto at spaced intervals for pushing the feed throughout the length of the trough in one direction—each paddle having a one way drive connection to the carrier.

Another object of the invention is to provide a feed distributing device having a feed receiving trough, the terminal end of which is provided with a device for automatically shutting off the power unit whenever the feed at the end of the trough has accumulated so as to pile up to a pre-determined height.

Another object of the invention is to provide a feed distributing device wherein a power unit is utilized to actuate the feed pushing paddles and wherein a counterbalancing spring is employed to assist the power unit during the period in which the paddles are pushing the feed through the trough, said counterbalancing spring having a retarding effect upon the power unit during the period in which the paddles are making their return trip, the overall purpose being to obtain a substantially uniform performance from the power unit.

Another object of the invention is to provide a feed distributing device in which a hopper is employed to initially store the feed and in which a driving arrangement is provided for performing the double function of moving the feed within the hopper out through a discharge mouth and at the same time actuating a scooping member for imparting initial movement to the feed after it has been discharged from the mouth of the hopper into the receiving trough.

Another object of the invention is to provide a novel arrangement for imparting a reciprocating movement to the bar which carries the feed pushing paddles.

Other objects and advantages of the invention will become apparent upon examination of the following specification and appended drawings in which:

Fig. 3 is a side elevational view of the invention showing only a portion of the receiving trough;

Fig. 4 is a fragmentary detail view taken on the line 4—4 of Fig. 3;

Fig. 5 is a fragmentary detail view taken on the line 5—5 of Fig. 3;

Fig. 6 is a fragmentary detail view taken on the line 6—6 of Fig. 3;

Fig. 7 is a plan view of a portion of the receiving trough, certain parts being shown in section;

Fig. 8 is a sectional view through the trough and taken on the line 8—8 of Fig. 7;

Fig. 9 is a sectional view through the trough taken on the line 9—9 of Fig. 7;

Fig. 10 is a fragmentary detail view taken on the line 10—10 of Fig. 9;

Fig. 11 is a fragmentary detail view taken on the line 11—11 of Fig. 9;

Fig. 12 is a sectional view through the trough and taken on the line 12—12 of Fig. 1; and Fig. 13 is a fragmentary sectional view taken on the line 13—13 of Fig. 12.

Figure 1:
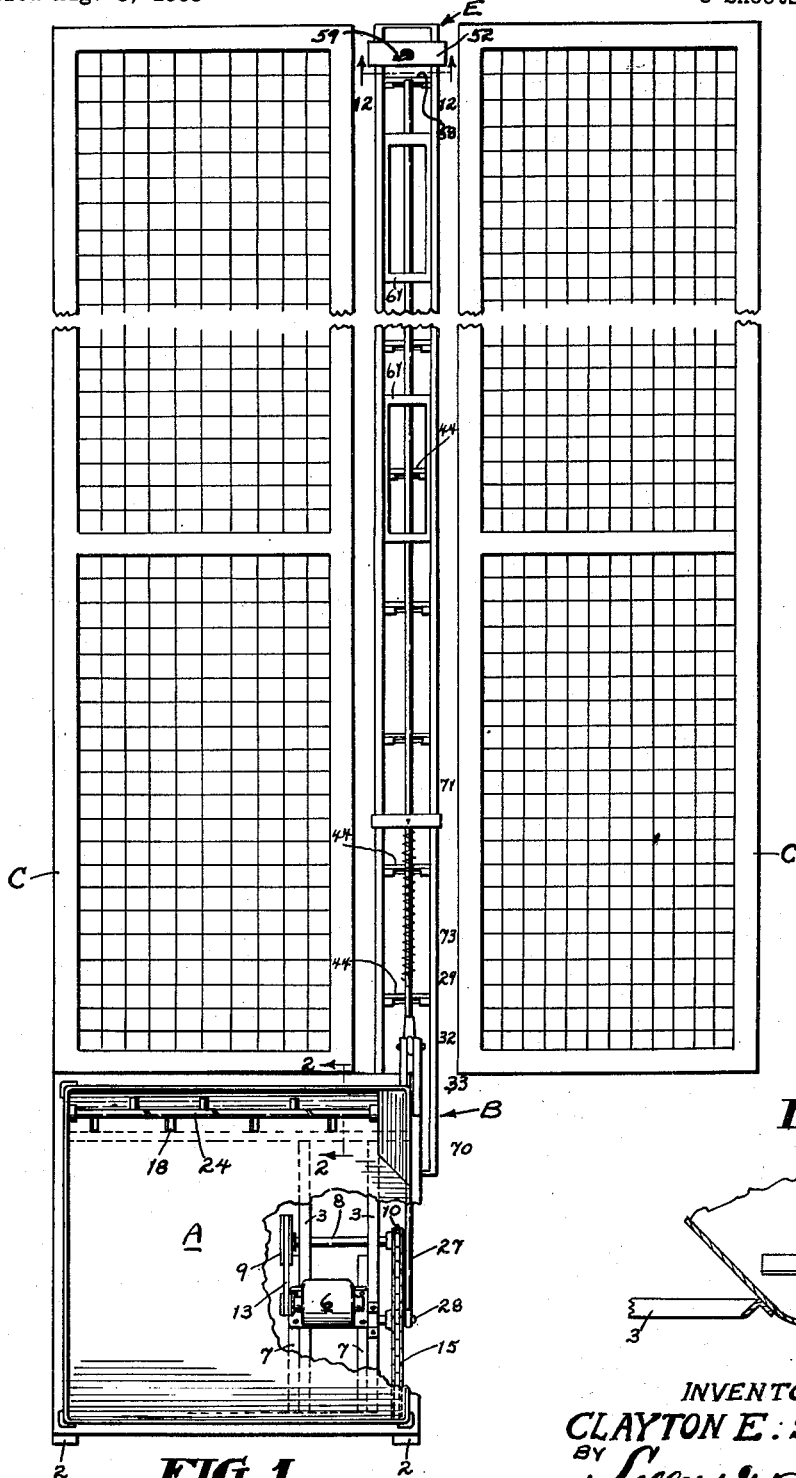
Fig. 1 is a plan view of the invention partly broken in section.

The invention is shown as it may be used with a poultry feeding arrangement, wherein the hopper A is mounted generally above the receiving trough B, which may extend a considerable distance between two rows of poultry feeding cages C which are lined up on either side of the trough. At the terminal end of the trough, or that end which is remote from the hopper A, an automatic unit E is provided for automatically cutting off the flow of the feed, when the feed has piled up to a pre-determined height at the end of the trough.

The hopper A may be secured to uprights 2, cross braces 3 being anchored to the lower end of the hopper. The trough B may be supported on cross ties 4 which in turn may be mounted on the longitudinal rail members 5, which if desired, can be made to extend throughout the entire length of the trough. A motor unit 6 may be mounted on diagonal braces 7 which extend between the uprights and the cross braces 3. A cross shaft 8 is carried by the cross braces 3 and has a pulley 9 fixed to one end and a sprocket pinion 10 fixed to the opposite end. A sprocket wheel 11 is also supported on one of the cross braces 3, and revolves on shaft 12. The motor unit drives the V-belt 13 which in turn drives pulley 9. The pulley drives the sprocket pinion which in turn drives the sprocket wheel by means of the link chain 15. Viewing Fig. 3 the sprocket wheel rotates in a counterclockwise direction.

The lower portion of the side wall 16 of the hopper is relieved at 17 to accommodate the initial feed moving apparatus. A worm 18 is mounted within the hopper near the rounded floor 19 and rotation of the worm in a clockwise direction viewing Fig. 3 moves the feed, generally designated by the numeral 20, along the rounded floor bottom of the hopper from whence the feed is spilled out the discharge mouth 21 which is formed at the floor of the hopper beneath the terminal edge 22 of the hopper wall 17. A Geneva movement wheel 23 is carried at the free end of the worm shaft 24 and is fixed to said shaft so as to impart rotation to the worm. The worm shaft 24 at the end adjacent the Geneva movement wheel may be carried by a bracket member 26. A pitman 27 is pivotally connected on the pin 28 which is fixed to the outer face of the sprocket wheel, the pivot pin being spaced from the axis of the sprocket wheel shaft so that rotation of the sprocket wheel imparts circular movement to this end of the pitman. The opposite end of the pitman is pivotally connected to the carrier bar 29 on a pivot pin 30. A pendulum rod 31 is pivotally connected at 32 to support braces 33 which may be anchored to the upper end of the hopper. The lower end of the pendulum rod is pivotally connected to link 34 on a pivot pin 35 carried by the link. The pendulum rod is shown bent near its lower end at 36 to prevent the rod from striking the front wall of the hopper when the sprocket wheel has moved the pitman to the extreme position of rearward movement, however, it will be understood that the support brace 33 could be lengthened so that a straight pendulum rod can be employed. In this type of arrangement the pitman would be slightly longer than as shown in Fig. 3 and the link 34 would be normally positioned slightly further forward with reference to the front wall of the hopper. Within one complete revolution of the sprocket wheel the pitman, of course, will impart one complete cycle of reciprocation to the carrier rod 29. The reciprocable movement of the carrier rod 29 will be substantially a rectilinear movement commencing from the pivot pin 30 to which the end of the pitman is connected, such rectilinear movement being modified to the extent of the arc described by the lower end of the pendulum rod in its swinging movement fore and aft during the cycle of reciprocation of the carrier rod 29.

A roller 38 is rotatably carried on a pin 39 which is anchored to the pitman and which projects transversely therefrom. With one complete revolution of the sprocket wheel the roller 38 will contact one of the legs of the Geneva movement wheel thereby imparting a segment of rotative movement thereto. The roller, of course, engages the legs of said wheel successively upon each revolution of the sprocket wheel. The Geneva movement wheel thereby imparts intermittent rotative movement to the worm 18 causing the feed to be spilled out through the discharge mouth 21 into the end of the trough B.

An end wall 40 closes off the end of the trough adjacent of the hopper. A scooping member designated generally by the numeral 41 has a tongue portion 42 which is anchored to the underside of the pitman and a paddle portion 43 at the end of said tongue which projects within the interior of the trough and which travels in a substantially elliptical path during each revolution of the sprocket wheel. This elliptical movement is generally indicated by the arrow adjacent the paddle portion. Thus with each revolution of the sprocket wheel, the pitman imparts what may be described as a scooping action to the paddle 43. In this scooping action the paddle 43 commencing from a rearward position proceeds downwardly and then forwardly thereby pushing any of the feed which has accumulated in front of the paddle in a direction toward the end of the trough remote from the hopper end. This scooping action of the paddle is sufficient to commence the initial flow of the feed until the feed reaches the first pusher plate 44. The first pusher plate 44 may be anchored to the forward end of the pitman and each succeeding pusher plate is carried by the carrier rod 29.

Viewing Figs. 9, 10 and 11 the detailed construction of each pusher plate is disclosed. A hinge pintle 45, which may be formed from a length of wire, is welded to the carrier rod 29 at a point which is substantially equidistant from the free ends of the pintle. Each end of the hinge pintle is bent downwardly forming ear portions 46, each of which lies behind the upper corners of the pusher plate. The pusher plate functions in the manner of a hinge butt, wherein the hinge eyes 47 are free to swing on the hinge pintle 45. It will be noted that the pusher plate is free to swing about the hinge pintle in a direction upwardly away from the pintle ears 46, however, such ears act as stops to prevent the downward swinging movement of the pusher plate beyond the position as shown in Fig. 11. Thus in the direction in which the carrier rod 29 is moving toward the remote end of the trough the pusher plate 44 engages the ears 46 and the lower marginal edge of the pusher plate functions in the manner of a scraper and any excess feed which has accumulated in front of the pusher plate above the level which is determined by the pre-determined spacing between the lower marginal edge of the pusher plate and the floor of the trough is thus caused to flow forwardly of the trough. On the return stroke of the carrier rod 29 the pusher plates, which may be constructed of light sheet metal, are easily pushed upwardly and merely drag lightly over the surface of the feed preparatory to the next working stroke of the carrier rod 29. Thus with each complete cycle of reciprocation of the carrier rod 29 the pusher plates move a quantity of feed toward the remote end of the trough.

The automatic shut-off device E which is located at the remote end of the trough may be carried on a pair of uprights 49 which may be anchored to opposite sides of the trough. A swinging arm 50 is anchored to a cross shaft 51 which is pivotally carried between the uprights 49. A shield 52 may partially cover a micro-switch 53 which is carried at the upper end of the upright. The switch lever 54 is received in a notch 55 formed in the upper end of the swinging arm. The lower end of the arm projects into the trough and has a paddle 56 fixed thereto. An end wall 57 closes off the end of the trough. When the feed is pushed against the front face of the paddle 56 by the last pusher plate 58 to a point where the accumulation of feed is sufficient to force the paddle rearwardly in the trough and thereby cause the arm to swing about the cross shaft 51, then the arm will actuate switch lever 54 opening the switch and the electrical circuit to the motor unit 6. Thereupon the feed distributing device ceases operating until the arm again swings downwardly so as to close the switch and the circuit to the motor. It will be noted that the lower end of the arm 50 is longer than that portion of the arm extending above the cross shaft 51 and is also heavier than the upper end of the arm, whereupon gravity forces the arm to swing downwardly to its normal position in which it comes to rest against stop member 75 and closes the switch.

Figure 2:
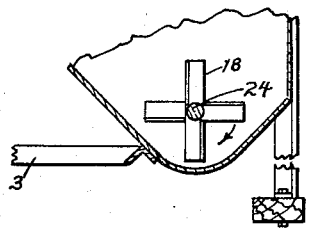
Fig. 2 is a fragmentary detail view taken on the line 2—2 of Fig. 1.

The carrier rod 29 is anchored to a sliding carriage member generally designated by the numeral 61. This carriage member comprises a pair of bars 62 which span the width of the trough and are welded at their opposite ends to a pair of angle irons 63 and 64, said angle irons being maintained in parallel relation to each other. The second pair of angle irons 65 and 66 are fixed to bracket members 67 which are secured to the side walls of the trough. These two angle irons are, of course, also maintained in parallel relation to each other and are disposed in face to face fashion with the respective mating angle irons 63 and 64. One or more ball bearings 68 may be disposed between the respective mating angle irons thereby permitting the carriage device 61 to freely slide longitudinally of the fixed angle irons 65 and 66 during the reciprocating movement of the carrier rod 29. Several of these carriage devices 61 may be provided throughout the length of the trough to prevent the carrier rod 29 from bending under its own weight and to maintain the lower marginal edges of the pusher plates 44 in the pre-determined desired spaced condition relative to the floor of the trough, whereupon a substantially uniform depth of feed is maintained within the trough during the operation of the feed distributing device. Fig. 2 discloses two of these carriage devices 61. The trough may be provided with an inwardly directed marginal flange 70 which may, if desired, extend throughout the entire upper border of the trough.

A U-shaped bracket 71 may span the trough and has its downwardly projecting legs anchored to the exterior side walls of the trough. The carriage rod 29 has an ear 72 anchored thereto and projecting upwardly therefrom. A tension spring 73 is anchored at one end to the bracket 71 and at the other end to the ear 72 and continuously urges the carriage rod 29 in a direction toward the remote end of the trough. Thus on the forward stroke of the carriage rod 29 the tension spring 73 assists the motor unit 6 in its task of forcing the pusher plates 44 to push the feed toward the terminal end of the trough and on the return stroke of the carriage rod 29 the tension spring 73 resists the motor unit 6 in its task of returning the carriage rod. The power required of the motor for returning the carriage rod is of course less than is required for the working stroke, since the pusher plates are merely being dragged lightly over the surface of the feed in the trough on the return stroke. Thereby the tension spring 73 functions to equalize the load carried by the motor unit at all times. The spring 73 additionally, however, serves to reduce the overall load on the motor unit 6.

I claim:

1. An automatically controlled feed distributing device comprising: a hopper having a discharge mouth; a trough with one end disposed beneath the discharge mouth and its other end remote from the hopper; a worm within the hopper; a rotatable wheel for driving the worm; a power unit; a speed reduction train driven by the power unit and including an ultimate driven wheel; a pitman actuated by the driven wheel; means on the pitman for actuating the rotatable wheel; a reciprocable rod above the trough; means connecting the pitman to the rod in a manner to impart reciprocating rectilinear motion to the rod in the direction of the trough; a pair of elongated angles extending longitudinally of the trough and in parallel alignment with each other; said angles being anchored to the interior side walls of the trough; a carrier for the rod, said carrier comprising: a second pair of elongated angles; a pair of bridging links anchored to said second angles and maintaining same in spaced parallel relation to each other; said second pair of angles each being disposed in face to face fashion with a respective first angle; a ball interposed between each of the mating sets of angles, whereby the carrier is adapted for rectilinear sliding movement relative to the first pair of angles; said carrier being connected to the reciprocable rod for actuation thereby.

2. A feed distributing device comprising a hopper having a discharge mouth; a trough having one end disposed beneath the discharge mouth, the other end of the trough being remote from the hopper and closed off; a power unit; a driven wheel actuated by the power unit; a pitman actuated by the driven wheel; means within the hopper actuated by the pitman for moving the feed within the hopper to the discharge mouth; a rod carried above the floor of the trough and having freedom of movement in the direction of the trough; means connecting the pitman to the rod in a manner to impart reciprocating rectilinear motion to the rod in the direction of the trough; means carried by the rod for pushing the feed in the trough toward the end thereof remote from the hopper, said means including a hinge pintle in the form of a single length of wire fixed to the rod and extending transversely of the rod; a hinge butt in the form of a pusher plate hingedly carried on the pintle and normally hanging in a substantially vertical plane within the trough; said hinge pintle having an end thereof bent downwardly to overhang the non-working face of the pusher plate whereby to prevent said plate from swinging about the pintle beyond a substantially vertical plane when the rod is actuated in a direction away from the hopper, said plate being free to swing upwardly out of a vertical plane when the rod is actuated toward the hopper.

3. A feed distributing device comprising: a hopper; a floor for said hopper rounded in section; said hopper having a discharge mouth at one terminal end of the floor; a rotatable type conveyor mounted within the hopper adjacent the floor thereof; a rotatable wheel drivingly connected to one end of the rotatable conveyor and being positioned externally of the hopper and adjacent the discharge mouth of the hopper; a trough having one end disposed beneath the discharge mouth of the hopper and its other end remote from the hopper; a power unit; a speed reduction train driven by the power unit and including an ultimate driven wheel; a pitman actuated by the driven wheel and engageable with the rotatable wheel for driving same; a single reciprocable bar extending longitudinally of the trough and positioned substantially centrally thereof, said bar having connection with the pitman for having substantially rectilinear reciprocating movement imparted thereto; feed pushing members carried by the bar and projecting within the trough for pushing the feed within the trough to the end thereof which is remote from the hopper.

4. A feed distributing device comprising: a hopper; a floor for said hopper; said hopper having a discharge mouth at one terminal end of the floor; a rotatable type conveyor mounted within the hopper adjacent the floor thereof; a rotatable wheel drivingly connected to one end of the rotatable conveyor and being positioned externally of the hopper and adjacent the discharge mouth of the hopper; a trough having one end disposed beneath the discharge mouth of the hopper and its other end remote from the hopper; a power unit; a speed reduction train driven by the power unit and including an ultimate driven wheel; a pitman actuated by the driven wheel; an abutment on the pitman for intermittently actuating the rotatable wheel; a reciprocable bar extending longitudinally of the trough, said bar having connection with the pitman for having substantially rectilinear reciprocating movement imparted thereto; feed pushing members carried by the bar and projecting within the trough for pushing the feed within the trough to the end thereof which is remote from the hopper; a pendulum support rod having, at its one end a pivotal connection at the upper end of the trough and at its other end a pivotal connection to the reciprocable bar.

5. A feed distributing device comprising: a hopper having a discharge mouth; a trough having one end disposed beneath the discharge mouth; the other end of the trough being remote from the hopper and closed off; a power unit; a driven wheel actuated by the power unit; a pitman actuated by the driven wheel and having one of its ends connected to the driven wheel at a point radially spaced from the axis of said wheel; a rotatable type conveyor mounted within the hopper; a rotatable wheel drivingly connected to the conveyor for intermittently rotating same to move the feed within the hopper to the discharge mouth thereof; said pitman having intermittent connection with the rotatable wheel for rotating the same; a bar extending longitudinally of the trough and having freedom of movement longitudinal of said trough; the end of the pitman opposite the end which is connected to the driven wheel having pivotal connection to one end of the bar; a pendulum pivotally connected at one end to the upper end of the hopper; a link pivotally connected to the opposite end of the pendulum, said link also having a connection at the pivotal connection between the end of the pitman and the end of the bar; said pitman imparting reciprocating substantially rectilinear movement to the bar in substantially a horizontal path, said rectilinear movement being modified to the extent of the gradual arcuate path described by the lower end of the pendulum, which arcuate path is determined by the radius generated from the axis of the pivotal connection of the pendulum at the upper end of the hopper and terminating at the pivotal connection between the lower end of the pendulum and the link; feed pushing members carried by the bar and projecting within the trough for pushing the feed within the trough to the end thereof which is remote from the hopper.

6. A feed distributing device as set forth in claim 5 and including a scooping member carried on the pitman a pre-determined distance between the ends of the pitman, said scooping member projecting within the trough and traveling in a substantially elliptical path which is imparted to it by the pitman and said scoop member imparting a scooping and forwardly pushing movement to the feed within the end of the trough beneath the discharge mouth of the hopper.

7. A feed distributing device comprising: a hopper having a discharge mouth; a trough having one end disposed beneath the discharge mouth, the other end of the trough being remote from the hopper and closed off; a power unit; a driven wheel actuated by the power unit;

a pitman actuated by the driven wheel and having one of its ends connected to the driven wheel at a point radially spaced from the axis of said wheel; a rotatable type conveyor mounted within the hopper; a rotatable wheel drivingly connected to the conveyor for intermittently rotating same to move the feed within the hopper to the discharge mouth thereof; said pitman having intermittent connection with the rotatable wheel for rotating same; a bar extending longitudinally of the trough and having freedom of movement longitudinal of said trough; the end of the pitman opposite the end which is connected to the driven wheel having pivotal connection to one end of the bar; said bar being actuated in a reciprocating, substantially rectilinear movement by the pitman, feed pushing members carried on the bar and projecting within the trough for pushing the feed within the trough toward the end thereof which is remote from the hopper, and resilient means having connection with the bar and with the trough for continuously urging the bar in a direction away from the hopper, whereby to assist in pushing the feed toward the end of the trough remote from the hopper.

8. A feed distributing device as set forth in claim 7 wherein the resilient means is in the form of a tension spring; a bridge portion spanning the trough and being anchored thereto, one end of said spring being connected to the bridge portion.

References Cited in the file of this patent
UNITED STATES PATENTS

| | | |
|---|---|---|
| 668,050 | Peck | Feb. 12, 1901 |
| 755,632 | Dempcy | Mar. 29, 1904 |
| 1,566,808 | Baker | Dec. 22, 1925 |
| 2,674,381 | Cady | Apr. 6, 1954 |
| 2,785,791 | Cordis | Mar. 19, 1957 |

FOREIGN PATENTS

| | | |
|---|---|---|
| 432,879 | Great Britain | Aug. 6, 1935 |